No. 648,074. Patented Apr. 24, 1900.
D. W. HUGHES & W. EDWARDS.
ASH PAN.
(Application filed Aug. 19, 1899.)
(No Model.) 2 Sheets—Sheet 1.
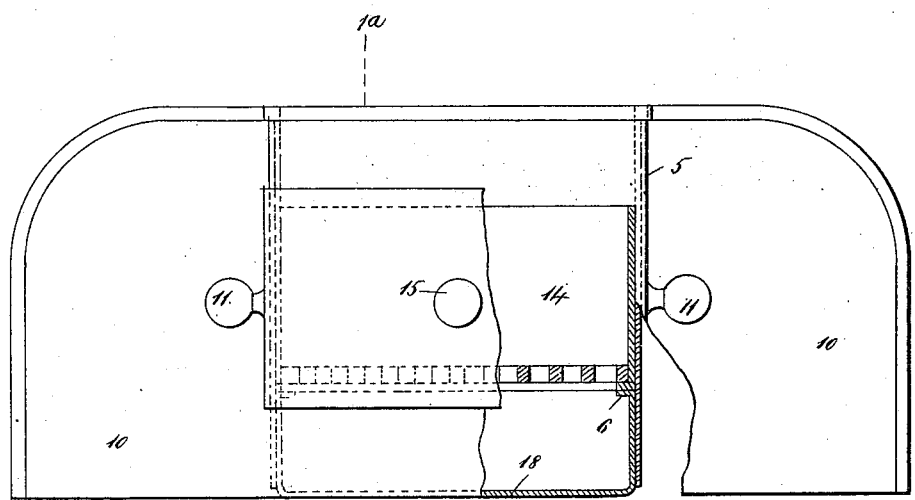
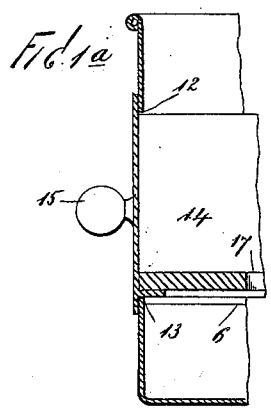
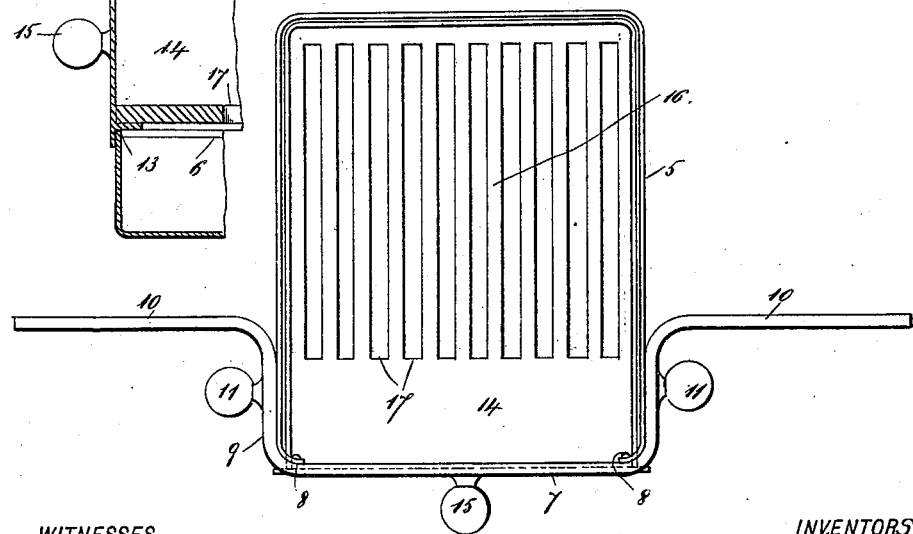

No. 648,074. Patented Apr. 24, 1900.
D. W. HUGHES & W. EDWARDS.
ASH PAN.
(Application filed Aug. 19, 1899.)
(No Model.) 2 Sheets—Sheet 2.
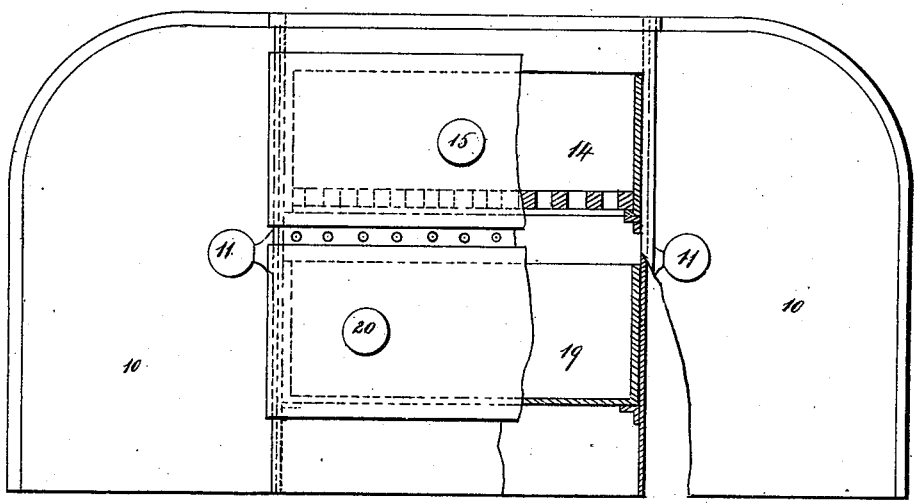
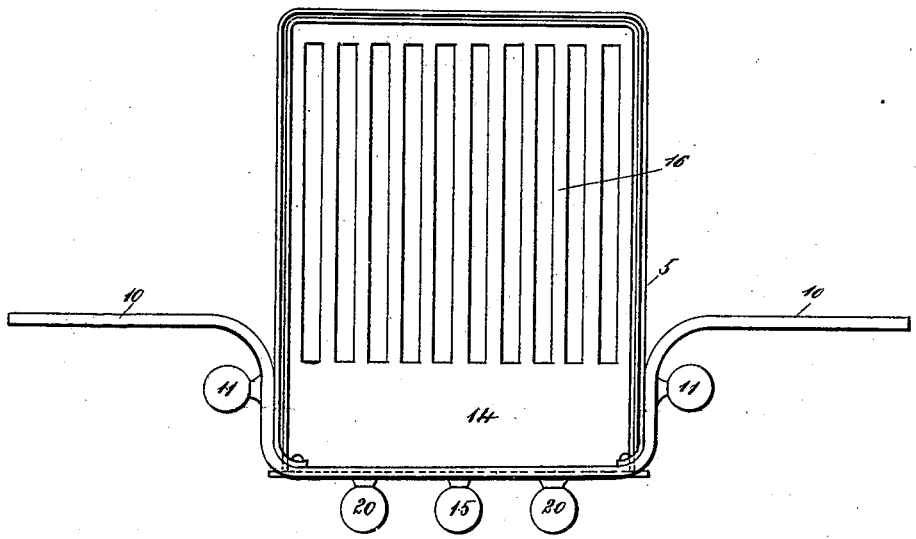
WITNESSES
INVENTORS
David W. Hughes
William Edwards
BY
Edgar Tate & Co.
ATTORNEYS

UNITED STATES PATENT OFFICE.

DAVID WILLIAM HUGHES AND WILLIAM EDWARDS, OF PONT-Y-PRIDD, ENGLAND.

ASH-PAN.

SPECIFICATION forming part of Letters Patent No. 648,074, dated April 24, 1900.

Application filed August 19, 1899. Serial No. 727,737. (No model.)

*To all whom it may concern:*

Be it known that we, DAVID WILLIAM HUGHES and WILLIAM EDWARDS, subjects of the Queen of Great Britain, residing at Newtown, Pont-y-Pridd, in the county of Glamorgan, England, have invented certain new and useful Improvements in Ash-Pans, of which the following is a full and complete specification, such as will enable those skilled in the art to which it appertains to make and use the same.

This invention relates to ash-pans for use in connection with fire-grates, cooking-ranges, stoves, and other heaters; and the object thereof is to provide an improved device of this class provided with a sliding drawer or tray having an open grid-shaped or perforated bottom, which, while allowing fine ashes to fall through, retains the cinders for further use, the fine ashes being collected in a pan or tray formed integrally with or removable from the body of the ash-pan.

The invention is fully disclosed in the following specification, of which the accompanying drawings form a part, in which—

Figure 1 is a sectional front elevation of an ash-pan constructed according to our invention and in which one removable drawer or tray only is used; Fig. 1ª, a section on the line 3 3 of Fig. 1; Fig. 2, a plan view; Fig. 3, a view similar to Fig. 1, and Fig. 4 a plan view thereof.

In the drawings forming part of this specification, the separate parts of our improvement are designated by numerals of reference, and in the practice of our invention we provide a casing 5, open at the top, which is preferably substantially rectangular and oblong in form and which is adapted to be inserted beneath a fire-grate or grate of a cooking-stove, range, or other heater, and which is provided in the form of construction shown in Figs. 1 and 2 with inside horizontal cleats or strips secured thereto or formed integrally therewith. The casing 5 is also provided with a front plate 7, which is riveted thereto, as shown at 8, and which is projected backwardly along the sides of the casing 5, as shown at 9, and extended outwardly to form side wings 10, and the backwardly-directed extensions 9 are provided with knobs or handles 11.

The front plate 7 is provided with a horizontal opening between the points 12 and 13, as shown in Fig. 1ª, and we also provide a removable drawer or tray 14, having a knob or handle 15 and which is adapted to be inserted through the opening in the front plate 7 and to rest upon and slide upon the cleats or strips 6, and the bottom of the drawer or tray 14 is provided with a grid-shaped or perforated bottom 16.

The openings in the bottom of the drawer or tray extend from the rear portion thereof forwardly to a predetermined distance, as shown at 17 in Fig. 2, the front portion of said bottom being closed, as shown in said figure.

The casing 5 is also provided in the bottom thereof, beneath the cleats or strips 6, with a closed pan or receptacle 18, and said drawer or tray may be easily removed from and inserted into the casing 5 by means of the knob or handle 15.

The fine ashes, cinders, charred coal, and other substances fall into the drawer or tray 14, and the fine ashes will sift through the openings in the bottom of the said drawer or tray into the pan or receptacle 18, while the cinders, charred coal, and similar substances will remain in said drawer or tray and may be again used.

The entire device may be agitated or shaken by means of the handles 11, or the drawer or tray may be separately shaken or agitated by means of the knob or handle 15, and the ashes will sift through the bottom of the drawer or tray, as will be readily understood, and the object of forming the bottom of said drawer or tray at the front without perforations or openings is to provide means for agitating said drawer or tray or moving the same back and forth, so as to sift the ashes through the bottom thereof without said ashes falling outside of the front of the casing 5.

In the construction shown in Figs. 3 and 4 we have shown a modification in which two removable drawers or trays are employed, a removable drawer or tray 19 being substituted for the stationary pan or receptacle 18, and the removable drawer or tray 19 is provided with two knobs or handles 20. In this form of construction ashes fall into the removable drawer or tray 19 and may be removed at any time without removing the main casing 5 from beneath the fire-grate, and with this exception the construction shown in Figs. 3 and 4 is the same as that shown in Figs. 1 and 2.

This device is simple in construction and operation and perfectly adapted to accomplish the result for which it is intended, and it will be apparent that changes in and modifications of the construction described may be made without departing from the spirit of our invention or sacrificing its advantages.

Having fully described our invention, we claim as new and desire to secure by Letters Patent—

1. An ash-pan, comprising an oblong casing open at the top, and provided with a front plate having an opening arranged to receive a drawer or tray, and a drawer or tray which is adapted to be inserted into said opening, and the bottom portion of which is provided with openings or perforations, said front plate being provided with a handle whereby it and the connected parts may be shaken, and said casing being also provided with a bottom receptacle, substantially as shown and described.

2. An ash-pan, comprising an oblong casing open at the top and provided with a front plate having an opening adapted to receive a drawer or tray, and a drawer or tray which is adapted to be inserted into said opening, and the rear portion of the bottom of which is provided with openings or perforations, and said casing being also provided with a bottom receptacle, said front plate being also provided with backwardly-directed extensions having handles, and side wings formed on said extensions, substantially as shown and described.

3. An ash-pan, comprising an oblong casing open at the top and provided with a front plate having an opening adapted to receive a drawer or tray, and a drawer or tray which is adapted to be inserted into said opening, and the rear portion of the bottom of which is provided with openings or perforations, said front plate being also provided with backwardly-directed extensions having handles, and side wings formed on said extensions, and the bottom portion of said casing being also provided with a removable drawer or tray having a closed bottom, and which is adapted to be inserted through the front plate, substantially as shown and described.

4. An ash-pan, comprising an oblong rectangular casing open at the top and provided with a front plate which is secured thereto and provided with backwardly-directed side extensions, and laterally-projecting side wings, said side extensions being provided with knobs or handles, and two removable drawers or trays which are adapted to be inserted into said casing through the front plate, the upper drawer or tray being provided with a bottom having openings or perforations, and each of said drawers or trays being provided with knobs or handles, substantially as shown and described.

In testimony that we claim the foregoing as our invention we have signed our names, in presence of the subscribing witnesses, this 31st day of July, 1899.

DAVID WILLIAM HUGHES.
WILLIAM EDWARDS.

Witnesses:
EVAN REES JONES,
THOMAS JONES.